United States Patent Office 3,542,871
Patented Nov. 24, 1970

3,542,871
PURIFICATION OF 4,4'-METHYLENE DIANILINE BY CRYSTALLIZATION
Edward J. Thompson, Watertown, Conn., assignor to The Upjohn Company, Kalamazoo, Mich., a corporation of Delaware
Filed July 29, 1968, Ser. No. 748,253
Int. Cl. C07c 89/04
U.S. Cl. 260—570                                           11 Claims

ABSTRACT OF THE DISCLOSURE

A process is disclosed for the separation, by crystallization, of methylene dianilines containing a high percentage of 4,4'-methylene dianiline from mixtures of methylene-bridged polyphenyl polyamines containing from 35 to 85% by weight of methylene dianilines. The mixture of starting polyamines is that obtained by acid condensation of aniline and formaldehyde. The process involves maintaining the polyamine mixture under equilibrium conditions at a temperature between the point of nucleation and the set point of the initial mixture, repeatedly removing and returning homogeneous liquid aliquots to the bulk of polyamine. This procedure is continued until the initially minute crystals of methylene dianiline have reached a size at which they can be readily separated. The crystalline methylene dianilines so isolated are enriched in the 4,4'-isomer. These diamines, optionally after further crystallization to obtain essentially pure 4,4'-methylene dianiline, can be used as curing agents, isocyanate intermediates and for all purposes for which methylene dianilines are conventionally employed. The mother liquor containing a mixture of polyamines with a reduced amount of methylene dianilines can be used as intermediates for the preparation of polymethylene polyphenyl isocyanates and like purposes.

BACKGROUND OF THE INVENTION

Field of the invention

The invention relates to an improved process for the isolation of methylene dianilines from a mixture of methylene-bridged polyphenyl polyamines obtained by acid condensation of aniline and formaldehyde containing about 35 to about 85% by weight of methylene dianilines, the remainder being polyamines of higher molecular weight, and is more particularly concerned with an improved crystallization process for separating from the aforesaid polyamine mixtures a product containing greater than 80% by weight of methylene dianilines, the proportion of 4,4'-isomer to 2,4'-isomer in the latter being at least 98:2.

Description of the prior art

Over the past decade there has been an increasing need for pure, low-cost monomers for the preparation of various polymers. One of the more important, and most costly to produce, is essentially pure 4,4'-methylene dianiline which is useful in the preparation of epoxy resin, polyamide, polyimide, polyurea, and polyurethane polymers. This diamine is also useful as an intermediate in the preparation of polyglycidyl amines, polyols and diisocyanates. For many purposes, especially in the preparation of high molecular weight crystalline polymers, the presence of significant amounts of the 2,4'- and 2,2'-isomers in the methylene dianiline is undesirable. Material which is substantially pure, i.e., contains at least 98% of 4,4'-methylene dianiline, is required for such purposes.

The process conventionally employed in the preparation of methylene dianilines is the well-known acid condensation of aniline and formaldehyde. Among the many methods hitherto employed for the isolation of 4,4'-methylene dianiline from the mixture of methylene-bridged polyphenyl polyamines so produced has been high vacuum fractional distillation, see, for example, German Pat. 1,205,975 and U.S. Pat. 3,274,245. Alternative methods for separating 4,4'-methylene dianiline from the methylene-bridged polyphenyl polyamines, have included conversion of the diamine to the corresponding amine hydrochloride followed by fractional crystallization of the latter (see, for example, U.S. Pat. 2,938,054) and solvent extraction of an acid solution of the polyamines (see, for example, U.S. Pat. 3,175,007).

Such methods of isolating 4,4'-methylene dianilines on a manufacturing scale are cumbersome and wasteful adding significantly to the cost of producing such materials. In addition, the separation methods which involve fractional distillation are wasteful by reason of the formation of undesirable by-products in the still residue due to polymerization, degradation and the like caused by prolonged exposure to heat. The potentially least wasteful method of recovering methylene dianilines from the aniline-formaldehyde condensate is by direct crystallization from the crude reaction product. It has been found, however, that the reaction mixture generally yields a mass of very fine crystals which is almost impossible to isolate by conventional methods such as filtration, centrifugation, and the like, because of a combination of small particle size of the individual crystals and very high viscosity of the crystalline slurry. Accordingly such direct crystallization procedures have not been used commercially hitherto.

We have now found that, under controlled crystallizing conditions as hereinafter defined, methylene dianilines can be separated readily from mixtures of methylene-bridged polyphenyl polyamines containing about 35% to about 85% by weight of methylene dianilines. We have found further that the materials so isolated are enriched in 4,4'-isomer as compared with the isomer proportion in the starting materials. Thus methylene dianilines containing a ratio of 4,4'-isomer to 2,4'-isomer of at least 98:2 can be obtained directly from mixtures in which the initial proportion of said isomers is as low as 90:10. The crystalline product and the mother liquor can both be used, for all purposes for which these polyamines are conventionally employed, without further purification. Since the overall separation process involves no loss of starting material said process has obvious advantages over those hitherto employed in the art. It has not previously been recognized that methylene dianilines rich in the 4,4'-isomer can be separated on a commercially useful scale from higher molecular weight methylene-bridged polyphenyl polyamines without adversely affecting, either by degradation, polymerization or like changes, the composition of the resultant polyamines. Further, as one skilled in the art realizes, a crystallization process is, indeed, a more economical process in terms of energy consumption than a distillation process because of the large differences between the latent heats of crystallization and distillation, the former being very much smaller.

SUMMARY OF THE INVENTION

This invention makes available for the first time a process for separating methylene dianilines, having a high proportion (of the order of 98%) of the 4,4'-isomer, by direct crystallization from a mixture of methylene-bridged polyphenyl polyamines containing about 35% to about 85% by weight of methylene dianilines which do not require further purification before use. Further, the process can be carried out without sacrifice of overall yield based on the starting materials employed.

In its broadest aspect, the process of the invention is a process for the crystallization of methylene dianilines rich in the 4,4'-isomer from a mixture of methylene-bridged polyphenyl polyamines containing about 35 to about 85% by weight of methylene dianilines obtained by acid condensation of aniline and formaldehyde, said process comprising the steps of:

(a) cooling with agitation a molten mixture of said methylene-bridged polyphenyl polyamines to an operating temperature above the setting point and below the point of nucleation, and maintaining said operating temperature of the resulting slurry substantially constant while (b) removing an aliquot from said polyamine mixture, (c) adding to the main batch of said polyamine, in an amount corresponding to the volume of aliquot removed, a homogeneous liquid polyamine mixture selected from the class consisting of (i) the aliquot itself in molten form and (ii) a molten polyamine mixture corresponding in overall composition to the said main batch, (d) repeating steps (b) and (c) until such time that a visual increase in crystal size is observed and the decrease in viscosity of said polyamine mixture substantially ceases and, (e) thereafter separating the crystalline product so obtained from the polyamine mother liquor.

DETAILED DESCRIPTION OF THE INVENTION

Figure 1:
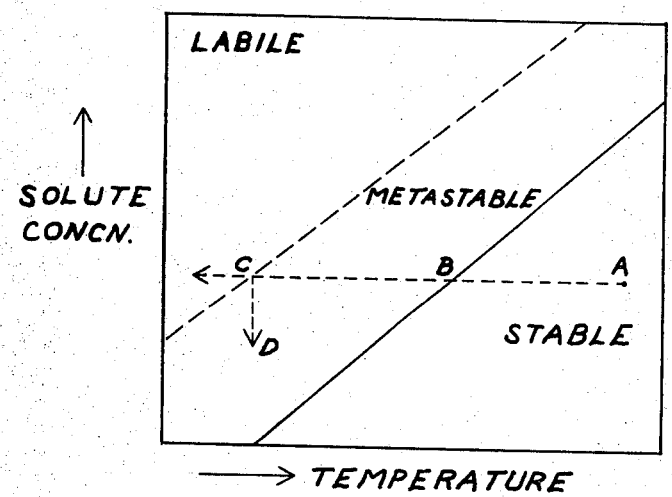
FIG. 1 shows a portion of a temperature-concentration diagram for a system of solute in solvent.

As set forth above the process of the invention can be applied to the separation of methylene dianilines from any mixture of methylene-bridged polyamines obtained by acid condensation of aniline and formaldehyde. A more detailed discussion of the known art relating to the preparation of such mixtures is given below. In general the crude reaction product derived by such methods contains unreacted aniline and the acid used as catalyst, said acid being present as amine acid addition salt. Such crude reaction products are neutralized, for example by treatment with the appropriate amount of sodium hydroxide, before being subjected to the process of the invention. Advantageously the crude reaction product is also treated, for example, by distillation under reduced pressure, to remove the excess aniline before being submitted to the process of the invention. However, in certain instances in which the reaction mixture contains lower proportions of methylene dianilines, e.g. in the case of those polyamine mixtures which contain about 35% by weight of methylene dianilines, it has been found preferable to apply the process of the invention to the crude reaction product from which the excess aniline has not been removed.

In carrying out the process of the invention the crude mixture of methylene-bridged polyamines is charged to a suitable vessel which can be any conventional vessel, open or closed, which is normally employed in the handling of fluids and which is provided with efficient agitation means and with temperature control means. This vessel will be referred to hereinafter as the crystallizer. The type of crystallizer is not critical, thus any of the crystallizers commonly employed in the art of crystallizing solutes from solvents can be used in the process of the invention, see for example, "Encyclopedia of Chemical Technology," edited by Kirk and Othmer, second edition, volume 6, page 498 et. seq., Interscience Publishers, New York (1965). The polyamine mixture is either heated to a homogeneous liquid state prior to charging into the crystallizer or is first charged to the latter and then heated until a homogeneous liquid is obtained. In the first step of the process of the invention this homogeneous liquid polyamine mixture is subjected to cooling with constant agitation sufficient to avoid, or substantially avoid, super-cooling the liquid mixture. The cooling is continued until a temperature is reached which falls within a given range, i.e., below the temperature at which nucleation occurs but above the temperature at which the material loses its fluid characteristics.

The appropriate temperature at which cooling is ended is a factor which varies from batch to batch. In order to appreciate the considerations which enter into a determination of this temperature for a given batch the following theoretical discussion is offered.

By way of explanation of the change which is taking place in the mixture of polyamines during this cooling phase of the operation reference is made to the diagram shown in FIG. 1. This diagram is a portion of a temperature-concentration diagram for a typical solvent-solute system. For purposes of this explanation the crude mixture of polyamines employed as starting material in the process of the invention can be regarded as a simplified solvent-solute system, the solute being the methylene dianiline and the solvent being the mixture of higher polyamines together with any unreacted aniline which may be present. It will be appreciated by one skilled in the art that this is a considerable oversimplification of the nature of the crude polyamine system but this oversimplification is made in the interest of clarity and understanding of the invention.

In FIG. 1 the lower solid line represents the normal solubility curve for the solute (methylene dianaline) in the solvent (mixture of higher polyamines plus aniline). The upper broken curve (the "super-solubility-curve") represents temperatures and concentrations at which spontaneous crystallization of solute is likely to occur. The exact position of the broken curve can vary and is a function of the particular conditions existing in the system whose behavior is recorded on the diagram in question. Thus, for example, the position of the broken curve is a function of the degree of agitation in the system. Illustratively, in a highly vigorously agitated system the broken curve is much closer to the solid curve than it is in a less vigorously agitated system.

Under the conditions prevailing in the area beneath the solid curve the system is a homogeneous liquid and shows no tendency for crystallization to occur. This is known as the "stable" region. Under the conditions represented by the area between the solid and the broken curve spontaneous crystallization will not normally occur but, if a seed crystal is formed in or is introduced into, a system within this area, crystal growth will take place. This area is known as the "metastable" zone. Finally, under the conditions prevailing in the area above the broken curve spontaneous crystallization will normally occur, although such crystallization is not entirely inevitable. This area is generally known as the "unstable" (or "labile") zone.

When a solution having the concentration and temperature represented by the point A is subjected to cooling (represented by movement to the left on the line ABC) with reasonable agitation, no spontaneous crystallization will normally occur until the point C is reached. If cooling is stopped at this point the concentration of solute remaining in solution will fall (due to separation of crystalline solute) until it reaches the level represented by point D in the diagram shown in FIG. 1. However, if cooling is not stopped at point C but is carried further along the line represented by ABC the amount of solid deposited will increase rapidly until a point is reached at which the whole system is substantially solid or is so viscous that mechanical agitation is no longer possible. This point will be referred to hereinafter as the "set-point" i.e. the point at which the mixture no longer shows the normal properties of a liquid.

It is to be noted that, if the cooling of the initial solution represented by the point A is carried out without agitation and under conditions in which no seeding occurs, it is possible to lower the temperature below the point represented by C without any spontaneous crystallization occurring. A supercooled liquid is thereby obtained. Indeed, it is possible under these circumstances to obtain a supercooled liquid which does not undergo any crystallization at all but passes into a glass state. A comprehensive discussion of the various considerations set forth above is to be found in Kirk and Othmer, ibid, page 482 et seq.

Applying the above considerations to the question of how to determine the temperature to which the starting polyamine mixture, in any given instance, should be cooled in the first stage of the invention, it will be seen that the minimum amount of cooling necessary in the case of a liquid mixture represented by point A in FIG. 1 is that required to bring it to the point C. The latter point represents the point of nucleation, i.e., the temperature at which spontaneous crystallization occurs. It is to be noted that, in practice, a small amount of supercooling will occur even with efficient agitation of the liquid being cooled. In other words the temperature of the solution will fall slightly below (0.5 to 1.0° C.) the point represented by C before spontaneous crystallization occurs.

Accordingly, if the starting liquid polyamine mixture is represented by the point A on the diagram in FIG. 1 the upper limit of the temperature range to which the mixture is brought in the first step of the process of the invention is represented by point C. The lower limit of said range is the lowest temperature, i.e. the closest temperature to the set point, at which the mixture can still be agitated. As stated previously the starting polyamine mixture becomes increasingly viscous as the temperature is lowered towards the set point and a point is reached at which the mixture can no longer be agitated.

As will be readily appreciated, the upper and lower limits of the temperature range discussed above can be determined for each particular starting mixture of polyamines by a process of trial and error. Similarly the optimum temperature within this range to which the starting mixture is brought in the first stage of the invention is also readily determined by a process of trial and error. This temperature will obviously vary from one particular polyamine mixture to another; it will also vary according to other factors such as the capacity of the agitating means and the design of the vessel in which the process is carried out. In general the optimum temperature is that at which the amount of solid which has separated is of the order of about 10 to about 45 percent by weight of the total initial charge.

Accordingly in the first stage of the process of the invention the charge of liquid polyamine mixture is cooled to a temperature which is below the temperature of nucleation but above the temperature at which the mixture can still be agitated with reasonable efficiency, the particular temperature, within this range, which is chosen for any given starting material being governed by the considerations discussed above. The temperature so chosen is referred to hereinafter as the "operating temperature" for the particular polyamine mixture employed.

The polyamine mixture is then maintained at this temperature until equilibrium conditions are established, i.e., no further increase in the amount of solid is detected. Depending upon the size of the batch being treated, the composition of the latter, and the efficiency of the agitation means, the time taken to reach equilibrium may vary from about 1 hour to about 24 hours. At this stage of the process of the invention the polyamine mixture is in the form of a highly viscous slurry in which the particles of crystalline material are too small to be seen by the naked eye and cannot be separated by conventional separation means such as centrifugation, filtration and the like.

Once equilibrium conditions have been established the second phase of the process of the invention is initiated. In this a cycle of operations is carried out in each of which an aliquot, advantageously from about 5 to about 15% by weight of the total charge, is removed from the bulk of the polyamine mixture. The removal of the aliquot can be accomplished by any conventional means, for example, by removal under gravity from a low point in the vessel containing the polyamine mixture or by pumping from said vessel.

The aliquot so removed from the crystallizer is replaced by an equivalent amount by volume of either fresh feed stock of the same composition as the initial starting polyamine mixture, or by the aliquot which was initially removed. In either case, the material being added in this manner to the main batch in the crystallizer must be in a molten form; i.e. it must be in the form of a homogeneous liquid free of solids. Thus, after the aliquot is removed, the aliquot itself or an equivalent amount of the starting polyamine which is to be added back to the crystallizer is first heated slowly until all solids disappear and a homogeneous liquid is obtained. In a particular aspect of the invention, it is preferred that the liquified material so obtained is supercooled, without agitation and in the absence of any seed crystals, to the operating temperature of the bulk of the polyamine mixture before being replaced therein. Once the aliquot or equivalent polyamine material is returned to the crystallizer the resulting mixture is maintained, with agitation, at the operating temperature until equilibrium conditions are again restored. This generally requires a period of from about 1 hour to about 8 hours depending upon the operating temperature and viscosity of the batch, the crystal growth rate, and the like factors.

When equilibrium has been established once again a second aliquot, comparable in size to the first aliquot, is removed and the above described cycle of operation is repeated, i.e. the aliquot, or an equivalent amount of polyamine mixture of the same overall composition, is heated until a homogeneous liquid is obtained and said liquid, preferably after supercooling to the operating temperature, is returned to the main bulk of the batch. Equilibrium is again permitted to be reached before a further aliquot is taken and this cycle of operation is repeated until a comparatively sudden change in physical properties of the bulk polyamine mixture is observed to take place. This change is manifested in a number of ways. For example, when this stage in the process of the invention is reached there is a clear change in particle size apparent to the naked eye. Thus the polyamine mixture, which has until this time had a muddy appearance, in which individual solid particles have been too small to detect with the naked eye, suddenly takes on the appearance of a suspension of clearly distinguishable crystals. This sudden change in particle size marks the point at which the solid present in the mixture is finally amenable to ready separation by filtration and like procedures. A second change which is readily observed, and which signals the end of this phase of the process of the invention, is concerned with the viscosity characteristics of the polyamine mixture. Thus, during the second phase of the process of the invention the initial high viscosity of the polyamine mixture has been falling rapidly. This rapid fall in viscosity suddenly ceases at substantially the same time as the visual change in appearance of the crystals occurs. The change in viscosity can be detected by any of the means normally adopted to measure viscosity. A particularly convenient and simple method consists in observing the change in load required by the agitator means to maintain a given rate of agitation. For example, where the agitator is powered by an electric motor the power required to maintain a given rate of agitation falls markedly as the viscosity of the stirred liquid falls. The point at which the decrease in viscosity ceases can be determined readily by observing the amount of power required by the agitator motor.

When the above end-point is observed to have been reached the crystalline solid present in the mixture can be isolated without any further treatment of the mixture or, if desired, the temperature of the polyamine mixture can first be lowered in order to bring about further separation of solid. It is found surprisingly that the mixture of polyamines remaining at the end of the above process can be cooled substantially below the temperature at which the initial polyamine mixtures becomes too viscous to handle, and is still sufficiently fluid to be handled and agitated.

The extent to which the final mixture obtained at the end of the process of the invention is cooled is governed by the desired purity of the methylene dianiline to be isolated and by the composition of the starting material. Obviously, if the starting material contains, for example, only 35% by weight of methylene dianilines, the amount of crystalline solid which can be caused to separate from the final mixture without risk of contaminating the crystalline methylene dianiline with higher polyamines is substantially less than the amount of crystalline solid which can be caused to separate from the final mixture obtained from a starting material containing 85% by weight of methylene dianilines. Further, the proportion of 4,4'-isomer to 2,4'-isomer in the crystalline material isolated according to the process of the invention depends, to some extent, on the amount of solid material which is caused to separate from the final mixture prior to isolation. The 4,4'-isomer crystallizes preferentially and accordingly the proportion of 4,4'-isomer to 2,4'-isomer in the isolated product is always greater than that obtaining in the starting material. It will be appreciated that the smaller the amount of solid which is allowed to separate from the final polyyamine mixture the higher the proportion of 4,4'-isomer to 2,4'-isomer therein.

In view of the number of such factors governing the situation it is not possible to give a quantitative indication of the extent to which the final polyamine mixture can be cooled at the end of the second phase of the process of the invention set forth above. The extent to which cooling is carried out is a matter which can be determined by trial and error in any given case. In general, however, it can be said that the temperature of the polyamine mixture should not be lowered beyond the level at which the amount of crystalline material which has separated is more than about 70% by weight of the total methylene dianilines present in the initial starting material.

The method by which the solid material is isolated from the final mixture, with or without cooling below the operating temperature, can be any of those conventionally employed in the art such as filtration, by gravity or by suction, centrifugation, and the like. The crystals so isolated will carry a small proportion of occluded mother liquor. If desired the crystals can be washed on the filter with a solvent or preferably with a saturated solution of methylene dianilines having the same composition (in terms of proportion of 4,4'-isomer to 2,4'-isomer) as the bulk of the crystals. Alternatively the crystals with occluded mother liquor can be subjected to recrystallization or other conventional procedures to effect final purification.

In this connection it is to be noted that the larger the size of crystal isolated in the process of the invention the smaller will be the proportion of occluded mother liquor. In describing the process of the invention it was indicated that the cycle of removing and replacing aliquots in the second phase of the process is continued until there is a visual increase in crystal size. This end point is also marked by a sudden cessation of the change in viscosity which has occurred during the earlier stages of the second phase. It is to be understood that this end point marks the time at which the crystalline material in the mixture is of sufficient size to be isolated readily. The attainment of this end point need not mean necessarily that the process should be halted at this point and the crystalline material isolated. Thus, if the process of removing and replacing aliquots is continued beyond the above end point the crystalline material will continue to grow in size and the procedure can be continued until any desired crystalline size is attained. In other words the above described end point merely marks the minimum time for which this phase of the process of invention is carried out; the maximum time for which this phase is continued is determined solely by the desired crystal size in the material to be isolated.

In a particular embodiment of the invention the above described process of the invention can be adapted to form the basis of a continuous crystallization process. In this embodiment the first and second phases of the process of the invention are carried out as hereinbefore described. When the end point of the second phase is attained and the desired crystal size has been achieved in the solid material present in the reaction mixture, the operating temperature and agitation of the mixture are maintained while a portion of about 5 percent to about 15% by weight of the mixture is removed from the crystallizer. The portion so removed is passed, if desired after cooling, to a zone in which separation of solid is achieved by any conventional method. To the bulk of the polyamine mixture remaining in the crystallizer is added untreated polyamine starting materials in a volume corresponding to that of the portion which has been removed to the separation zone. The untreated polyamine starting material must be in a molten state before being added to the bulk of the material in the crystallizer. However, as in the previously described general procedure, it is preferred that the molten polyamine feed stock is first supercooled to the operating temperature of the bulk of material in the crystallizer before being added to the latter. The mixture so produced in the crystallizer is maintained at the operating temperature with agitation until equilibrium conditions have again been established. The point at which equilibrium conditions are obtained is determined empirically by measuring the crystal growth rate at a specific temperature in an aliquot of the polyamine being used. At this point, the cycle is repeated, namely an aliquot is removed from the crystallizer to the separation zone and a further portion of untreated polyamine mixture, equal in volume to the aliquot removed, is added, preferably in a supercooled molten state, to the crystallizer. Thus, there is established a cycle of operations which can be repeated indefinitely thereby adapting the process of the invention to a continuous process with obvious attendant advantages on the commercial scale.

In a further particular embodiment of the process of the invention in which the latter is adapted to continuous operation the following procedure is adopted.

The polyamine starting material is charged to a crystallizer which takes the form of a cylindrical vessel mounted with its longitudinal axis in a vertical plane. An exit port is provided at the upper end of said crystallizer through which polyamine mixture can be removed, passed through a heating zone in which the polyamine mixture is heated to yield a homogeneous liquid, and then, if desired, through a cooling zone in which the homogeneous liquid polyamine mixture is supercooled, before being returned to the crystallizer via an entrance port provided in the lower end thereof. Agitation means are provided in said crystallizer for maintaining the solid material in suspension, said agitation being so adjusted that a particle size gradient is established within the crystallizer. The smaller particles are thus maintained in suspension at the upper end of the crystallizer while the larger particles settle to the lower end of the crystallizer.

Using the above apparatus the initial steady state is achieved by carrying out the first two stages of the process of the invention in a continuous manner. The polyamine mixture, after charging to the crystallizer, is cooled to the desired operating temperature and material is then continuously removed from the upper end of the crystallizer, and passed through the heating zone, at a rate and temperature so adjusted that the material emerging from the heating zone is a homogeneous molten liquid. The latter can then be returned directly to the lower end of the crystallizer. Preferably the molten liquid material is supercooled to the batch operating temperature before being returned to the crystallizer, the supercooling being effected by passage through a cooling zone. The need to supercool at this stage is determined largely by the rate at which material is being cycled in the above manner and by the heat loss characteristics of the crystallizer. Thus, if the molten liquid material can be returned to the crystallizer without causing any significant change in the operating temperature within the latter it is unnecessary to supercool the molten liquid material before returning it to the crystallizer.

The process of continuously removing material from the upper end of the crystallizer and returning it, in a homogeneous molten state, to the lower end of the crystallizer, is continued, with appropriate agitation of the material within the crystallizer until the change in viscosity characteristics and crystal size occurs which marks the end of the second stage of the process of the invention. At this point withdrawal of material is commenced from the lower end of the crystallizer to a zone in which the crystalline material is separated using methods previously described. At the same time fresh starting polyamine mixture is added, at a rate corresponding to the rate of withdrawal of material to the separation zone, to the mixture being removed from the upper end of the crystallizer prior to the point at which said mixture enters the heating zone. By operating in this manner the newly added polyamine mixture is caused to enter the crystallizer in a homogeneous molten state and a continuous cycle of operations is established. The particle size gradient maintained within the crystallizer ensures that no crystalline material is removed to the separation zone until it has reached the desired particle size.

The advantages of operating the process of the invention in the above continuous manner will be readily apparent. Ways of modifying the above procedure without departing from the essential scope of the process of the invention will also be readily apparent to one skilled in the art.

In yet another embodiment of the invention the crystalline methylene dianilines obtained by the process of the invention and/or the recovered mother liquor (which contains a decreased proportion of methylene dianilines as compared with the starting material) can be submitted again to the process of the invention. As pointed out above the judicious selection of temperature of the reaction mixture in the solid separation step of the process of the invention can, if desired, yield substantially pure methylene dianiline in which case there is no point in resubmitting this material to the process of the invention. On the other hand the use of a temperature in the solid separation stage which produces a high solids content in the polyamine mixture can give rise to methylene dianiline which is substantially more pure than the initial starting material but which still contains significant amounts of higher polyamines. Such materal can be resubmtted to the process of the invention one or more times, to obtain methylene dianilines of higher purity. Similarly the mother liquors recovered in the final stage of the process of the invention can be submitted again to the process of the invention to recover further methylene dianilines. In general, the mother liquors can be reprocessed unless and until the methylene dianiline content thereof falls to about 35% by weight.

Other refinements and modifications of the invention can be made as will be obvious to one skilled in the art, without departing from the spirit and scope of this invention, which latter is limited only by the claims which are appended hereto.

The polyphenyl polyamines employed as starting materials in the process of the invention are mixtures of methylene-bridged polyphenyl polyamines containing about 35 percent to about 85 percent by weight of isomeric methylene dianilines, the remainder of said polyphenyl polyamines being triamines and polyamines of higher molecular weight. The proportions of the various isomeric forms of the methylene dianilines in the methylene-bridged polyphenyl polyamines is generally of the order of about 90 percent of the 4,4'-isomer and 10 percent of the 2,4'-isomer. However, the precise proportions of the isomers can be varied by methods well-known in the art; see, for example, U.S. Pat. 3,277,173. These mixtures of methylene-bridged polyphenyl polyamines are known in the art or can be prepared by methods well-known in the art, such as, by the reaction of aniline and formaldehyde in the presence of hydrochloric acid; see, for example, Wagner, Journal of the American Chemical Society, 56, 1944–1946 (1934); U.S. Pats. 2,683,730 and 2,950,263, and German Pat. 1,131,877. The composition of a particular methylene polyphenyl polyamine mixture depends upon the ratio of aniline to formaldehyde used in its preparation. Thus, it has been reported that polyphenyl polyamine mixtures containing 35 to 85 percent by weight of methylene dianilines are produced by reacting aniline and formaldehyde in the molar ratios of 4 to 2.5 and 4 to 1, respectively; see, for example, U.S. Pats. 2,683,730, 2,950,263, 3,254,031, and 3,277,133. The condensation products so obtained can then be neutralized, if desired, by using aqueous alkali such as sodium hydroxide solution and the organic layer is separated and treated, for example by partial distillation to remove unreacted aniline. The overall composition of the methylene-bridged polyphenyl polyamines which are described above can be represented by the general formula:

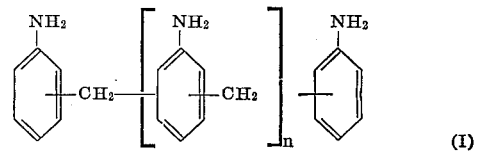

(I)

wherein $n$ has an average value equal to or greater than 0.1 (corresponding to about 85% by weight diamine) but not greater than one (corresponding to about 35% by weight diamine). The preferred methylene polyphenyl polyamines for use as starting materials in the process of the invention contain about 60 to about 85% by weight of methylene dianilines which corresponds to a value of $n$ in the above formula of about 0.6 to about 0.1 respectively.

The crystalline methylene dianilines obtained by the process of the invention can be used without further treatment for the purposes enumerated above, or, if desired, can be subjected to further crystallization or like procedures to improve the 4,4'-isomer content still further. In either case, whether so purified or not, the methylene dianilines are particularly useful as isocyanate intermediates, to which they are converted by phosgenation in accordance with prior art procedures; see, for example, Canadian Pat. 745,173. The recovered mother liquor obtained in the process of the invention contains an overall reduced amount of methylene dianilines but a higher proportion of the 2,4'-isomer. It can be used for all purposes for which similar polyamine mixtures are conventionally employed. The mixed polyamine mother liquor is particularly useful as an isocyanate intermediate. Thus it can be phosgenated in accordance with prior art procedures to give the corresponding mixtures of polymethylene polyphenyl polyisocyanates; see, for example, U.S. Pats. 2,683,730; 2,950,263; 3,012,008; and 3,097,191; Canadian Pat. 665,495 and German Pat. 1,131,877.

Thus, in a particular aspect of the process of the invention a methylene-bridged polyphenyl polyamine mixture containing 85% by weight of methylene dianilines can be subjected to the process of the invention to crystallize from 5% to about 70% by weight of the original mixture of methylene dianilines. The crystalline material so obtained contains greater than 98% by weight of the 4,4'-isomer. The mother liquors therefrom, containing 15% to about 80% by weight of methylene dianilines, are particularly useful as intermediates in the preparation of polyisocyanates. The polyisocyanates so obtained which contain less than 60% by weight of methylene bis(phenyl isocyanates) are generally employed in the preparation of rigid and semi-rigid cellular polymers and the polyisocyanates containing more than 60% by weight of methylene bis(phenyl isocyanates) are employed in the preparation of flexible and semi-flexible cellular polymers; see, for example, Saunders et al., "Polyurethanes: Chemistry and Technology," Part II, Interscience Publishers, New York (1964).

Thus, it is apparent that the present invention provides, inter alia, a method of meeting fluctuating market demands for one of several possible materials. The rate and scale of production of the 4,4'-methylene dianiline can be so adjusted that sufficient of this material is produced to meet not only market demands for this composition as such but also to provide sufficient of the mother liquor to meet the demands for compositions derived therefrom. The economic advantages attendant upon the ability to produce these interrelated products concurrently and in varying proportions will be obvious to one skilled in the art.

The following examples describe the manner and process of making and using the invention and set forth the best mode contemplated by the inventor of carrying out the invention but are not to be construed as limiting. All parts are given by weight except where otherwise indicated. The following procedures were used in analyzing the starting materials and preparations of the invention:

ANALYTICAL PROCEDURE

(1) Vapor phase chromatograph

The percentages of the 2,4'- and 4,4'-isomers of methylene dianiline were determined by vapor phase chromatography using anthracene as an internal standard.

The sample and anthracene were mixed in a four:one ratio, and diluted with methylene chloride using about 0.625 gram of the mixture per milliliter of methylene chloride. An F and M model-700 Vapor Phase Chromatograph was used equipped with a 0.125 inch diameter by 6.0 foot column, 5% silicone gum rubber (SE-30) on a diatoport 80-100 mesh support. The instrument was obtained from Hewlett Packard, F & M Scientific Division, Avondale, Pa.

(2) Gel permeation chromatography

The gel permeation chromatographic analyses were made using an instrument obtained from Waters Associates, Framingham, Mass.

EXAMPLE 1

This example illustrates the preparation of a methylene-bridged polyphenyl polyamine which can be employed as starting material in the process of the invention:

Following the procedure of U.S. Pat. 2,950,263, four moles of aniline and two moles of 37 percent aqueous formaldehyde were reacted in the presence of two moles of hydrochloric acid. The reaction mixture was made basic by the addition of 50% sodium hydroxide solution. The organic layer was separated from the water layer and unreacted aniline was removed by steam distillation. The resultant methylene-bridged polyphenyl polyamine, designated Polyamine A, had an $n$ value in Formula I above of approximately 0.2 and contained about 68 percent by weight of methylene dianilines, the remainder being triamines and polyamines of higher molecular weight.

Employing the same reaction procedures as above but varying the proportions of aniline, formaldehyde, and hydrochloric acid (HCl) as set forth in Table I, methylene-bridged polyphenyl polyamines having the percentages of methylene dianilines (MDA) shown in said table were obtained:

TABLE I

| Molecular proportions | | | Percent MDA |
|---|---|---|---|
| Aniline | Formaldehyde | HCl | |
| 4.0 | 1.00 | 1.00 | 83 |
| 4.0 | 2.26 | 2.20 | 50 |
| 4.0 | 2.30 | 1.35 | 45 |
| 4.0 | 2.55 | 2.20 | 40 |

EXAMPLE 2

Approximately 2 liters of molten (90° C.) Polyamine A, prepared as described in Example 1 above, were charged to a scraped wall crystallizer (a two-liter jacketed resin flask) equipped with a circulating constant temperature bath, a bottom outlet and a low speed motor (25-50 r.p.m.) and stirrer. The contents of the flask were cooled with agitation (20-30 r.p.m.) to 70° C. (the operating temperature) and held thereat for a period of about 24 hours to obtain equilibrium between the solid and liquid phases. The appearance of the polyamine mixture at this point was a hazy brown material of mud-like consistency. The mixture was highly viscous. A 200 ml. aliquot of the polyamine mixture was removed (via the bottom outlet) and an equivalent amount of Polyamine A at a temperature of about 90° C. was recharged to the crystallizer. The process of removing and replacing aliquots of the mixture was continued, over a period of about 8 hours, until such time that a visual increase in crystal size accompanied by a sudden decrease in viscosity was observed. At this time the viscosity of the polyamine mixture remained essentially unchanged. The appearance of the polyamine mixture in the crystallizer was a dark brown clear liquid containing white platelet crystals. The temperature of the crystallizer was then lowered with agitation over a period of 2-3 hours to a separation temperature of about 64° C., which was about 6° C. below the setting point of the original Polyamine A. The reduction in temperature from 70° C. to 64° C. induced further crystal growth. A portion of 93.7 g. was then drained into a preheated (circa 64° C.) 900+$G$ centrifuge wherein the mother liquor and crystalline solids were separated.

The 27.6 grams of crystalline product so obtained, was analyzed (a) by gel permeation chromatography (GPC) and found to contain 98.3% by weight of methylene dianilines. The proportion of 4,4'-isomer to 2,4'-isomer in said mixture was found, by vapor phase chromatography, to be 99:1.

The 66.1 grams of remaining mother liquor was found to contain, by GPC analysis, 47.8% by weight of methylene dianilines. The isomeric ratio of the methylene dianiline, as found by VPC analysis, was 87.3% of the 4,4'-isomer and 12.7% of the 2,4'-isomer. The remaining 52.5% of the mother liquor was made up of higher molecular weight polyamines having more than two amino groups per molecule.

EXAMPLE 3

The starting polyamine mixture employed in the process described in this example was obtained by combining crystalline methylenedianiline material obtained in a series of runs carried out substantially in accordance with the process described in Example 2 but employing a lower separation temperature so that the crystalline solid had a lower methylene dianiline content than the isolated material described in Example 2. The overall composition of the combined batches employed as starting material in the process described below was found, by GPC, to be 84.7% by weight of methylene dianilines. The proportion of 4,4'-isomer to 2,4'-isomer, as found by VPC, was 98.5:1.5.

A charge of 2500 g. of this mixture of polyamines was placed in the crystallizer employed in the process described in Example 2. The contents of the flask, originally at 90° C., were gradually cooled with agitation to an operating temperature of 84° C. and held thereat for a period of about 2 hours to obtain equilibrium between the liquid and solid phases. The polyamine mixture at this time was a viscous off-white mixture. A 200 gram aliquot of the polyamine mixture was removed and reheated to 90° C. to obtain a homogeneous molten solution, free of solids, of the polyamine mixture. The aliquot was then supercooled to the operating temperature (84° C.) of the main batch and was replaced in the crystallizer. This process of removing, reheating, supercooling and replacing of an aliquot of the mixture was continued, over a period of about 8 hours, at which time the crystal size increased and the viscosity of the solution, after showing a sudden fall, remained unchanged. The temperature of the crystallizer was then lowered with agitation over a period of about 6 hours to a separation temperature of about 80° C. which was about 2° C. below the setting point of the original starting polyamine mixture. The cooling from the operating temperature (84° C.) to the separation temperature (80° C.) caused further crystal growth. The batch was then drained into a preheated, (80° C.) 900+G centrifuge wherein the mother liquor and crystalline solids were separated.

The resultant 1160 grams of white crystals obtained had a melting point of 89–92° C. Gel permeation chromatographic analysis showed the crystalline product to contain 98% by weight methylene dianilines. VPC analysis showed the proportion of 2,4'-isomer in the product to be zero.

EXAMPLE 4

This example illustrates the crystallization of methylene dianilines from a methylene-bridged polyphenyl polyamine mixture containing approximately 25% by weight of unreacted aniline.

The starting polyamine mixture contained, by GPC analysis, 24.4% by weight aniline, 64.3% by weight methylene dianilines and 12.3% by weight of higher molecular weight polyphenyl polyamines. Two liters of the above described polyamine mixture were charged to the scraped wall crystallizer described in Example 2. The flask contents were cooled with moderate agitation to an operating temperature of about 45° C. and held at this temperature for a period of about 1 hour until equilibrium of the solid and liquid phases was obtained. A 200 gram aliquot of the polyamine mixture was removed and reheated to about 60° C. to obtain a homogeneous molten solution of the polyamine mixture. The aliquot was then supercooled to the operating temperature (45° C.) of the main batch and was replaced in the crystallizer. The process of removing, reheating, and supercooling of an aliquot of the mixture was continued at approximately hourly intervals until a visual increase in crystal size was observed and the viscosity of the solution after a sudden drop, remained essentially unchanged. The time taken to reach this stage was approximately 8 hours from the start of removal of aliquots. The temperature of the mixture was then lowered with agitation over a period of about 6 hours to a separation temperature of 33° C. The reduction in temperature from 45° C. to 33° C. caused further crystal growth of the crystals already present in the mixture. The batch was then drained into a 900+G centrifuge wherein the crystalline solids were separated from the mother liquor. The crystalline product so obtained was found to contain, by GPC analysis, 91% by weight of methylene dianilines. The proportions of 4,4'-isomer to 2,4'-isomer, as found by VPC, was 99.2:0.8.

EXAMPLE 5

This example illustrates the effect of varying the separation temperature on the composition of the methylene dianiline crystals obtained by the process of the invention.

Following exactly the same procedure of Example 2 and employing the same Polyamine A as starting material but varying the temperature at which the separation of crystalline product was carried out, the following results were obtained.

TABLE II

| Run No. | Separation temperature, °C. | Product | Methylene dianilines [1] | | | 
|---|---|---|---|---|---|
| | | | 4,4'-isomer | 2,4'-isomer | Oligomers [2] |
| a | 70.9 | Crystalline product | 86.0 | 0.76 | 13.2 |
| | | Mother liquor | 57.6 | 5.2 | 37.2 |
| b | 59.3 | Crystalline product | 80.0 | 1.3 | 18.7 |
| | | Mother liquor | 43.6 | 7.1 | 49.3 |
| c | 55.6 | Crystalline product | 74.4 | 1.1 | 24.5 |
| | | Mother liquor | 37.6 | 7.6 | 54.8 |

[1] Determined by vapor phase chromatography.
[2] Methylene-bridged polyphenyl polyamines of higher molecular weight having more than two amino groups per molecule.

I claim:

1. A process for the crystallization of methylene dianilines rich in the 4,4'-isomer from a mixture of methylene-bridged polyphenyl polyamines containing about 35 percent to about 85 percent by weight of methylene dianilines, the remainder being polyamines of higher molecular weight, comprising the steps of:
   (a) cooling with agitation a molten mixture of said methylene-bridged polyphenyl polyamines to an operating temperature above the setting point and below the point of nucleation, and maintaining said operating temperature of the resulting slurry substantially constant while
   (b) removing an aliquot from said polyamine mixture,
   (c) adding to the main batch of said polyamine, in an amount corresponding to the volume of aliquot removed, a homogeneous liquid polyamine mixture selected from the class consisting of (i) the aliquot itself in molten form and (ii) a molten polyamine mixture corresponding in overall composition to the said main batch;
   (d) repeating steps (b) and (c) until such time that a visual increase in crystal size is observed and the decrease in viscosity of said polyamine mixture substantially ceases and,
   (e) thereafter separating the crystalline product so obtained from the polyamine mother liquor.

2. The process of claim 1 wherein liquid polyamine mixture added to the main polyamine batch in step (c) has been supercooled to the operating temperature of the main batch of said polyamine mixture prior to admixture therewith.

3. The process of claim 1 wherein the aliquot removed from said polyamine mixture is replaced by a polyamine mixture of substantially the same composition as said starting methylene-bridged polyphenyl polyamine mixture which has been supercooled to the operating temperature of the main batch of polyamine mixture prior to admixture therewith.

4. The process of claim 1 wherein the mixture of methylene-bridged polyphenyl polyamines employed as starting material contains about 60 to about 85 percent by weight of methylene dianilines.

5. A process for the crystallization of methylene dianilines rich in the 4,4'-isomer from a mixture of methylene-bridged polyphenyl polyamines containing about 35 percent to about 85 percent by weight of methylene dianilines, the remainder being polyamines of higher molecular weight, comprising the steps of:
(a) cooling with agitation a molten mixture of said methylene-bridged polyphenyl polyamines to an operating temperature above the setting point and below the point of nucleation, and maintaining said operating temperature of the resulting slurry substantially constant while
(b) removing an aliquot from said polyamine mixture,
(c) adding to the main batch of said polyamine, in an amount corresponding to the volume of aliquot removed, a homogeneous liquid polyamine mixture selected from the class consisting of (i) the aliquot itself in molten form and (ii) the original starting polyamine mixture in molten form;
(d) repeating steps (b) and (c) until such time that a visual increase in crystal size is observed and the decrease in viscosity of said polyamine mixture substantially ceases and,
(e) thereafter reducing the operating temperature to a temperature above the setting point of the newly formed polyamine mixture and,
(f) separating the crystalline product so obtained from the polyamine mother liquor.

6. The process of claim 5 wherein the aliquot removed from said polyamine mixture is returned to the main batch of polyamine mixture after reheating to a molten state and supercooling to the operating temperaure of said main batch.

7. The process of claim 5 wherein the aliquot removed from said polyamine mixture is replaced by a polyamine mixture of substantially the same composition as said starting methylene-bridged polyphenyl polyamine mixture which has been supercooled to the operating temperature of the main batch of polyamine mixture prior to admixture therewith.

8. The process of claim 5 wherein the mixture of methylene-bridged polyphenyl polyamines employed as starting material contains about 60 to about 85 percent by weight of methylene dianilines.

9. A continuous process for the separation of crystalline methylene dianilines rich in the 4,4'-isomer from a mixture of methylene-bridged polyphenyl polyamines containing about 35% to about 85% by weight of methylene dianilines, the remainder being polyamines of higher molecular weight, comprising the steps of:
(a) cooling with agitation a molten mixture of said methylene-bridged polyphenyl polyamines to an operating temperature above the setting point and below the point of nucleation, and maintaining said operating temperature of the resulting slurry substantially constant while
(b) removing an aliquot from said polyamine mixture,
(c) adding to the main batch of said polyamine, in an amount corresponding to the volume of aliquot removed, a homogeneous liquid polyamine mixture selected from the class consisting of (i) the aliquot itself in molten form and (ii) the original starting polyamine mixture in molten form;
(d) repeating steps (b) and (c) until such time that a visual increase in crystal size is observed and the decrease in viscosity of said polyamine mixture substantially ceases and,
(e) thereafter transferring an aliquot of said resulting polyamine mixture to a separation zone wherein the liquor
(f) adding to the bulk of said polyamine mixture a portion of untreated polyamine starting material in an amount by volume corresponding to the aliquot removed to the separation zone,
(g) allowing the resulting admixture to reach a steady state; and
(h) thereafter continuously repeating the sequence of operations set forth in (e), (f) and (g).

10. The process of claim 9 wherein the aliquot removed to the separation zone in step (e) is subjected to cooling prior to separation therefrom of the crystalline material.

11. The process of claim 9 wherein the portion of untreated polyamine starting material in step (f) is first brought to the operating temperature of the bulk of the polyamine mixture before being added to said mixture.

References Cited
UNITED STATES PATENTS 3,367,969    2/1968    Perkins _____ 260—570

ROBERT V. HINES, Primary Examiner

U.S. Cl. X.R.

260—2, 47, 77.5, 78, 453